United States Patent
Diamond et al.

(10) Patent No.: US 10,895,496 B2
(45) Date of Patent: Jan. 19, 2021

(54) METHOD AND SYSTEM FOR MONITORING ROTOR BLADES OF A TURBOMACHINE USING BLADE TIP TIMING (BTT)

(71) Applicant: University of Pretoria, Pretoria (ZA)

(72) Inventors: David Hercules Diamond, Pretoria (ZA); Philippus Stephanus Heyns, Pretoria (ZA); Abraham Johannes Oberholster, Pretoria (ZA)

(73) Assignee: University of Pretoria, Pretoria (ZA)

( * ) Notice: Subject to any disclaimer, the term of this patent is extended or adjusted under 35 U.S.C. 154(b) by 117 days.

(21) Appl. No.: 16/095,830

(22) PCT Filed: Apr. 25, 2017

(86) PCT No.: PCT/IB2017/052364
§ 371 (c)(1),
(2) Date: Oct. 23, 2018

(87) PCT Pub. No.: WO2017/187333
PCT Pub. Date: Nov. 2, 2017

(65) Prior Publication Data
US 2020/0249074 A1    Aug. 6, 2020

(30) Foreign Application Priority Data
Apr. 26, 2016  (ZA) .................... 2016/02858

(51) Int. Cl.
*G05B 23/02*  (2006.01)
*G01H 1/00*  (2006.01)
*G08B 21/18*  (2006.01)

(52) U.S. Cl.
CPC .......... *G01H 1/006* (2013.01); *G05B 23/027* (2013.01); *G05B 23/0232* (2013.01); *G08B 21/182* (2013.01)

(58) Field of Classification Search
CPC ............ G05B 23/0232; G05B 23/0235; G05B 23/0237; G05B 23/02; G05B 23/027; G05B 2219/37351; G08B 21/182; G01H 1/006
(Continued)

(56) References Cited

U.S. PATENT DOCUMENTS 5,501,105 A * 3/1996 Hernandez ............. G01H 1/003
324/226
5,895,857 A * 4/1999 Robinson ............... G01H 1/003
73/602
(Continued)

FOREIGN PATENT DOCUMENTS

EP    2 199 764 A2    6/2010
EP    2 581 725 A2    4/2013

OTHER PUBLICATIONS

International Search Report for PCT/162017/052364 dated Jun. 28, 2017.

*Primary Examiner* — Hung T Nguyen
(74) *Attorney, Agent, or Firm* — Knobbe, Martens, Olson, Bear LLP

(57) ABSTRACT

A method of estimating vibration characteristics of moving rotor blades in a turbomachine comprising a housing and rotor including a shaft with the rotor blades attached thereto includes measuring, by at least one proximity sensor, a Time-of-Arrival (ToA) of a proximate tip of a moving rotor blade. The method includes manipulating, by a control module, timing data to determine a corresponding blade tip deflection at each measured ToA, expressing blade tip vibration behaviour as a Bayesian statistical model consisting of intermediate model parameters, wherein model coefficients in the statistical model are probabilistic quantities as opposed to conventional, deterministic quantities, and expressing, by the control module, the determined blade tip (Continued)

deflections as observed values in the statistical model. The method includes manipulating the intermediate model parameters in the statistical model using Bayesian linear regression or inference to estimate the intermediate model parameters and consequently the vibration behaviour of the rotor blade.

18 Claims, 11 Drawing Sheets

(58) Field of Classification Search
 USPC ............ 340/683, 683.3, 517; 702/34, 35, 56
 See application file for complete search history.

(56) References Cited

U.S. PATENT DOCUMENTS

| | | | |
|---|---|---|---|
| 6,094,989 A * | 8/2000 | Twerdochlib | G01N 29/07 |
| | | | 702/56 |
| 8,146,433 B2 * | 4/2012 | Kishino | G01M 13/045 |
| | | | 73/593 |
| 8,457,909 B2 * | 6/2013 | Russhard | G01H 1/006 |
| | | | 702/56 |
| 8,532,939 B2 * | 9/2013 | Bhattacharya | F01D 21/003 |
| | | | 702/35 |
| 9,657,588 B2 * | 5/2017 | Panicker | F01D 21/003 |
| 10,260,388 B2 * | 4/2019 | Potyrailo | G01N 33/2888 |
| 2010/0161245 A1 | 6/2010 | Rai et al. | |
| 2013/0096848 A1 * | 4/2013 | Hatch | G01M 13/045 |
| | | | 702/39 |

* cited by examiner

METHOD AND SYSTEM FOR MONITORING ROTOR BLADES OF A TURBOMACHINE USING BLADE TIP TIMING (BTT)

CROSS REFERENCE TO RELATED APPLICATIONS

This application is a U.S. National Phase Application of PCT International Application Number PCT/IB2017/052364, filed on Apr. 25, 2017, designating the United States of America and published in the English language, which is an International Application of and claims the benefit of priority to South African Patent Application No. 2016/02858, filed on Apr. 26, 2016. The disclosures of the above-referenced applications are hereby expressly incorporated by reference in their entireties.

FIELD OF INVENTION

This invention relates to monitoring of turbomachinery and more specifically to a method and system for monitoring rotor blades of a turbomachine using Blade Tip Timing (BTT).

BACKGROUND OF INVENTION

A turbomachine can be classified as a machine that extracts or imparts work from/to a fluid (e.g., any liquid or gas) by means of rotating blades. The blades (henceforth called rotor blades) are attached to a shaft that rotates (henceforth called the rotor). The rotor blades are therefore fundamental to the operation of any turbomachine.

As rotor blades are mechanical structures, the complete structure tends to vibrate when excited (i.e. when dynamic loads are applied to the structure, such as when the rotor blade is extracting/imparting energy from/to the fluid). The tip deflection of the rotor blade at each time instant is defined as the distance that the blade tip is displaced from its non-vibrating condition (i.e. resting condition). Tip deflections are therefore those changes in rotor blade tip position apart from the rigid rotation experienced by the rotor blades due to the rotation of the rotor.

The blade tip deflections are assumed to behave according to a specific mathematical form. This mathematical form is usually some form of periodic motion, like a harmonic oscillator. The mathematical form consists of a combination of basis functions and coefficients. For example, the tip deflections (x) can be assumed to behave according to:

$$x(t) = A \cos \omega t + B \sin \omega t + C. \qquad (1)$$

The Eq. 1 is an example of an undamped harmonic oscillator. The coefficients governing this example of periodic motion are A, B, C, and $\omega$ (omega). Any form of periodic motion can however be used to describe the motion. The fundamental challenge is then to determine the model coefficients.

Blade Tip Timing (BTT) is a non-invasive technique used for measuring the tip deflections of rotor blades as they pass stationary sensors or probes mounted in the turbomachine casing. The blade tip deflections are calculated from knowledge of the expected arrival time and the true arrival time, or ToA (Time-of-Arrival). Many different methods exist to determine the blade tip deflection from the measured ToAs. A shaft encoder can sometimes be used to determine an angular position of the shaft, or the shaft angular position can be derived from the ToAs. The novel method starts after the BTT data acquisition system has acquired the blade tip deflections. A tip deflection is therefore measured every time that a blade passes proximate a probe. Multiple tip deflections are then used to infer the vibration amplitude, frequency and phase, or the coefficients of the assumed vibration model.

The Applicant desires an improved method using BTT to solve the model coefficients of Eq. 1 or any other assumed vibration model, thereby to calculate or approximate deflection characteristics of the rotor blades in use. More specifically, the present method and system incorporates a BTT data acquisition system to acquire measurements relating to blade tip deflections. A tip deflection is usually therefore calculated from measurements every time that a blade passes underneath a probe. Multiple tip deflections are then used to infer the vibration amplitude, frequency and phase, or the model coefficients of the assumed vibration model.

These tip deflections and solution to the assumed vibration model can be used to infer valuable information about the condition of the rotor blades and the operating conditions inside the turbomachine. Some of the information that one would want to infer from the tip deflections are:

- Knowing whether or not the current turbomachine operating condition is damaging to the rotor blades. Certain operating conditions give rise to rotor blade resonance and causes large tip deflections of the rotor blades. The large tip deflections cause excessively large stresses in the rotor blade structure that can lead to damage being initiated (like a crack) or already present damage being intensified. More specifically, in the power generation industry, the severity of operating conditions related to flexible generation, where the loads on steam turbines need to adapt quickly to the demands of the grid, can be linked to blade vibration.
- Inferring the natural frequencies of rotor blades. Rotor blades, like many mechanical structures, naturally tend to vibrate at certain frequencies based on the geometry and material properties of the rotor blade. These frequencies are called the rotor blade's natural frequencies. Natural frequencies can be used to infer information concerning rotor blade health and the blades' susceptibility to resonance under certain operating conditions. One can also use knowledge about natural frequencies to create/update existing numerical models of the rotor blades. One can then virtually simulate the response of the rotor blade under any operating condition.
- Estimating the accumulated damage experienced by a blade due to vibration. The vibration amplitude and frequency, determined from Eq. 1 or any other assumed vibration model, can be used in conjunction with an appropriate mapping function, to estimate the amount of damage experienced by a blade due to blade vibration. The mapping function will map the inferred (or solved) blade vibration model parameters (of Eq. 1 or any other assumed model) to blade damage acquired during the vibration. The mapping function can contain a Finite Element Model (FEM) or any other appropriate structural mechanics relation between blade tip motion and structural stress in the blade. The mapping function may also include a function to convert from dynamic structural stress to fatigue damage, such as the Stress-Life method or the Strain-Life method or any other appropriate method to convert the structural stress experienced by the blade to damage. By using vibration model parameters and the mapping function, the time until the rotor blade is expected to fail (where failure can be classified for example as the time taken until a crack develops to a predefined length in the rotor blade, or quite literally the time until the blade is expected to separate into two parts at the crack plane). With knowledge of the expected time until failure, it is possible to plan turbomachine outages to replace the blades. The outages can therefore be scheduled as far as possible apart from one another to sweat the assets as much as possible, but close enough to mitigate the risk of a catastrophic failure.

Trending long term changes in model parameters. If continuous monitoring of the blade vibrations is performed, long term changes in the inferred model parameters, or quantities that result from further calculation of the inferred model parameters, can be detected. These long term changes can be indicative of slowly propagating structural damage which could cause catastrophic damage to the turbomachine.

As far as the Applicant is aware, three of the main approaches to estimate the vibration natural frequency and amplitude are discussed below.

1. The first approach uses the conventional Fourier transform, or techniques based on the conventional Fourier transform, on the measured tip deflections. This method can only be applied if the vibration frequency is sufficiently low to prevent aliasing. This is seldom the case in practice. As such, the Fourier transform may have limited applicability.
2. The Auto-Regressive (AR) method. Some publications have indicated that the AR method can detect the vibration frequency and phase of the turbine blades. The method uses a harmonic oscillator equation. The method, however, requires equidistant proximity probe spacing.
3. A very popular method used in practice is the Circumferential Fourier Fit (CFF) method. The method is not always called by this name but its mathematical form is consistent in all its applications. This method is described in the following two patents:
EP 2 199 764
U.S. Pat. No. 8,457,909

Traditionally, inferring the desired information from BTT signals is known to be difficult because of high levels of noise, uncertainty and inherent limitations in the data due to the measurement approach (e.g., aliasing). The present invention aims to ameliorate these drawbacks and the Applicant believes is novel with regards to the approach used to determine/quantify the vibration frequency, amplitude and phase, or the model coefficients of any assumed vibration model.

SUMMARY OF INVENTION

Accordingly, the invention provides a method of estimating vibration characteristics of moving rotor blades in a turbomachine comprising a housing and rotor including a shaft with the rotor blades attached thereto, using Blade Tip Timing (BTT), the method including:
  measuring, by at least one proximity sensor, a Time-of-Arrival (ToA) of a proximate tip of a moving rotor blade;
  storing, in a memory module at least temporarily, timing data indicative of a plurality of ToA measurements of the rotor blade;
  manipulating, by a control module, the stored timing data to determine a corresponding blade tip deflection at each measured ToA;
  expressing, by a control module, a blade tip vibration behaviour as a Bayesian statistical model consisting of intermediate model parameters, wherein model coefficients in the statistical model are probabilistic quantities as opposed to conventional, deterministic quantities;
  expressing, by the control module, the determined blade tip deflections as observed values in the statistical model;
  manipulating, by the control module, the intermediate model parameters in the statistical model using Bayesian linear regression or Bayesian inference thereby
  to estimate the intermediate model parameters and consequently the vibration behaviour of the rotor blade; and
  assessing, by the control module and through an appropriate goodness-of-fit criteria or Bayesian model evidence, accuracy of the determined model coefficients.

The proximity sensor may be mounted into a housing of the rotor blade. The proximity sensor may be mounted outside the housing and configured to take measurements through the housing.

The method may include measuring, by a shaft encoder, signals that can be used to estimate a shaft rotational motion as a function of time.

The statistical model may include basis functions and quantities measurable from the turbomachine.

The largest fundamental difference between the existing methods and the present invention (the Bayesian model) is that existing methods solve the vibration model parameters as deterministic quantities, while the present invention solves the parameters as probability distributions. Another way to explain this is to say that:
  existing methods solve each model parameter as a single quantity, i.e. every model coefficient is fixed to one single value; and
  the present invention solves each model parameter as being a probability density, i.e. there are multiple values that every model parameter can be, some being more likely than others.

Manipulating the intermediate parameters may include using Bayesian linear regression or any form of Bayesian inference to determine the coefficients of Eq. 1 or any other assumed vibration model. More specifically, the step of setting up the statistical model and manipulating the intermediate parameters may include:
  expressing, by the control module, the intermediate model parameters as random variables with prior probabilities;
  constructing, by the control module, a likelihood function describing the likelihood that particular combinations of the intermediate model parameters could be responsible for creating the measured tip deflections;
  using Bayes' theorem to convert the prior probability and likelihood function into a posterior probability over the model coefficients.

The prior probabilities and likelihood function may be chosen as any probability distribution, or probabilistic model. For example, a widely used probability distribution that may be applied to the problem is the Gaussian distribution.

Multiple tip deflections may then be used to infer the vibration amplitude, frequency and phase, or the model coefficients of any assumed vibration model.

The method may include fixing, through prior knowledge of the blades, some of the intermediate model parameters and solving or inferring the rest of the parameters.

The method may include raising an alert in response to the estimated vibration characteristics exceeding a first threshold (e.g., a maintenance threshold). The method may include raising an alert by sending an alert message to a designated recipient (e.g., a plant administrator).

The method may include automatically stopping the turbomachine in response to the estimated deflection characteristics exceeding a second threshold (e.g., a failure threshold). The control module may be connected to a control system of the turbomachine. The method may include sending, by the control module, an interrupt message to the control system of the turbomachine.

The method may include long term monitoring of the inferred model coefficients or tip deflections to identify trends that might be indicative of impending rotor blade failure, or other changes in other aspects of the turbomachine characteristics. The method may include sending, by the control module, an interrupt message to the control system of the turbomachine or a designated recipient, e.g., a turbine administrator if the long term trend of the monitored quantity indicates damage to the turbomachine.

The method may include converting of the probabilistic model parameters into probabilistic estimates of damage accumulated by the rotor blade due to vibration. A mapping function may be used to map between blade tip deflection model coefficients and the stress in the blade. A conversion function may then be used to map between the stress state in the blade and an accumulated damage, such as the Stress-life method or the Strain-life method.

The method may include the creation of a guideline that maps turbomachine operating conditions, such as speed, backpressure, load etc. to blade vibration and blade damage accumulation. This guideline can then be used as an operational tool to stay away from damaging operating conditions.

The method may include measuring a tip deflection every time that the associated rotor blade passes the sensor. There may be plural sensors arranged circumferentially around the housing. Accordingly, the method may include measuring the ToA of a blade tip at various angular orientations.

The invention extends to a computer-readable medium which, when executed by a computer, causes the computer to perform the method defined above. The computer-readable medium may be non-transitory.

The invention extends to a system configured to determine the vibration characteristics of moving rotor blades in a turbomachine comprising a housing and rotor including a shaft with the rotor blades attached thereto, using Blade Tip Timing (BTT), the system including:
at least one proximity sensor operable to measure a Time-of-Arrival (ToA) of a proximate tip of a moving rotor blade;
a memory module communicatively coupled to the sensor and configured to store, at least temporarily, timing data indicative of a plurality of ToA measurements of the rotor blade; and a control module communicatively coupled to the memory module and configured to:
  manipulate the stored timing data signals to determine the corresponding blade tip deflection at each measured ToA;
  express the blade tip vibration as a Bayesian statistical model consisting of intermediate model parameters wherein the model coefficients in the statistical model are probabilistic quantities as opposed to conventional, deterministic quantities;
  express the determined blade tip deflections as observed values in the statistical model;
  manipulate the intermediate model parameters in the statistical model using Bayesian linear regression or Bayesian inference thereby to estimate the intermediate model parameters and consequently the vibration behaviour of the rotor blade; and
  assess, through an appropriate goodness-of-fit criteria or Bayesian model evidence, accuracy of the determined model coefficients.

There may be a shaft encoder that is used to obtain raw data from the rotor which is processed in the control module to determine the shaft motion. The control module might infer the shaft motion from the measured proximity probe data as well.

The shaft encoder may be an incremental or absolute shaft encoder or other sensor coupled to the shaft of the turbomachine, to measure signals that can be used to determine the shaft rotational motion. In the absence of a shaft encoder, the shaft rotational motion may be derived from the ToA measurements.

There may be a plurality of sensors. The sensors may be spaced circumferentially around the housing. The sensors may be spaced circumferentially along only an arcuate portion of the housing. The sensors may be spaced along a 90° arc. For example, there may be four probes, each spaced 20°-30° apart. The sensors may be irregularly spaced apart.

BRIEF DESCRIPTION OF DRAWINGS

The invention will now be further described, by way of example, with reference to the accompanying diagrammatic drawings.

In the drawings:

FIG. 12 shows a diagram of the wiring configuration between some of the components specified in FIG. 10 and FIG. 11.

DETAILED DESCRIPTION OF EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
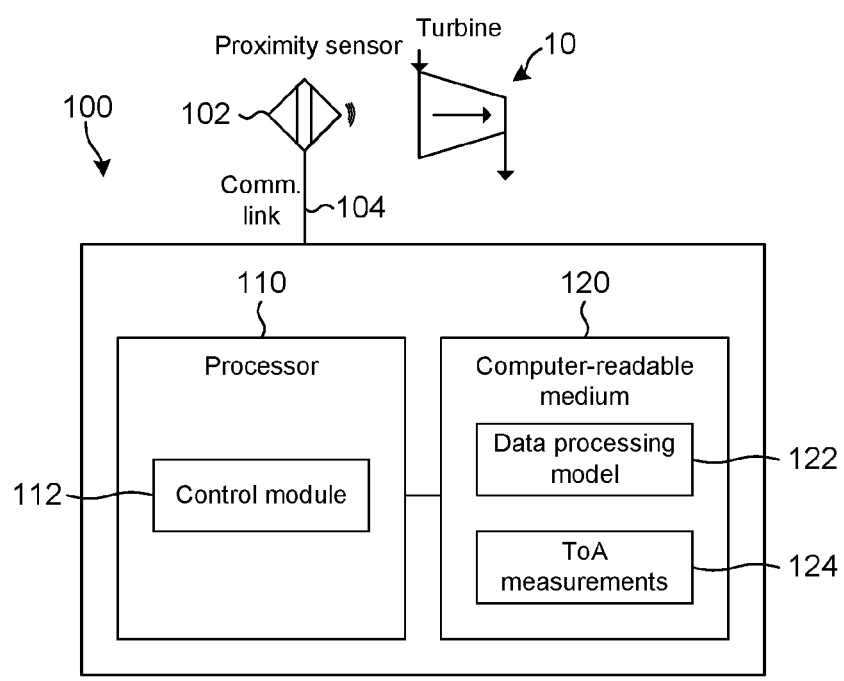
FIG. 1 shows a schematic view of a system for estimating blade tip vibration characteristics of moving rotor blades in a turbomachine, in accordance with the invention.

FIG. 1 illustrates a system 100 operable to estimate deflection characteristics of moving rotor blades in a turbomachine. In this example, the turbomachine is a turbine 10. The turbine 10 may be a conventional turbine and its operation need not necessarily be modified to be compatible with the system 100 (other than incorporation of sensors 102). The turbine 10 comprises a housing and rotor including a shaft with the rotor blades attached thereto (see FIG. 3 for more detail).

The system 100 includes a plurality of sensors 102 mounted to a housing of the turbine 10. The system 100 could include a shaft encoder 103 to measure information used to determine the shaft motion. The system 100 includes a processor 110 connected to the sensors 102 by means of a communication link 104 (which may be wired or wireless). The processor 110 is coupled to a computer-readable medium 120. On the computer-readable medium 120 is stored a data processing model 122 and ToA measurements 124—these are further described below.

The processor 110 embodies a control module 112 which is configured to process ToA measurements in accordance with the data processing module 122 thereby to estimate rotor blade tip vibration. The control module 112 is a conceptual module corresponding to a functional task performed by the processor 110. It is to be understood that the processor 112 may be one or more microprocessors, controllers, Digital Signal Processors (DSPs), or any other suitable computing device, resource, hardware, software, or embedded logic.

Figure 3:
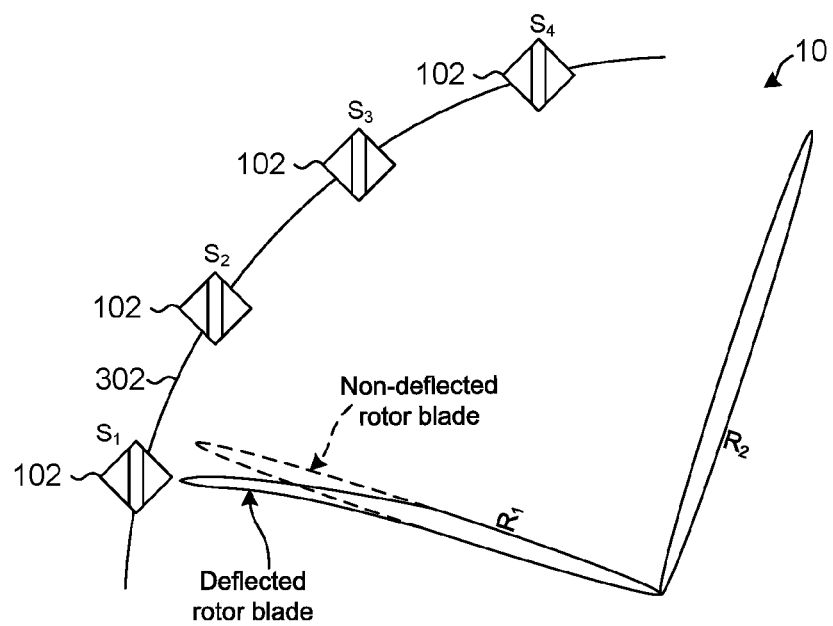
FIG. 3 shows a schematic view of an enlarged portion of a turbine of FIG. 1.

The system 100 has a plurality of proximity sensors 102 (only one of which is illustrated in FIG. 1). FIG. 3 illustrates this in more detail, with the plural sensors 102 being designated $S_1$-$S_4$ and arranged circumferentially on the housing 302. Each proximity sensor 102 is configured to measure a Time-of-Arrival (ToA) of a proximate tip of a moving rotor blade ($R_1$, $R_2$, ...). These measured ToAs are stored on the memory module 120 for processing. The system 100 could have a shaft encoder 103 that measures raw signals of the rotor motion, after which the data is stored on the memory module 120.

The data processing model 122 essentially directs the control module 112 to implement a tailored statistical model and Bayesian inference the tip deflections derived from the ToA measurements and possible shaft encoder signals.

Figure 2:
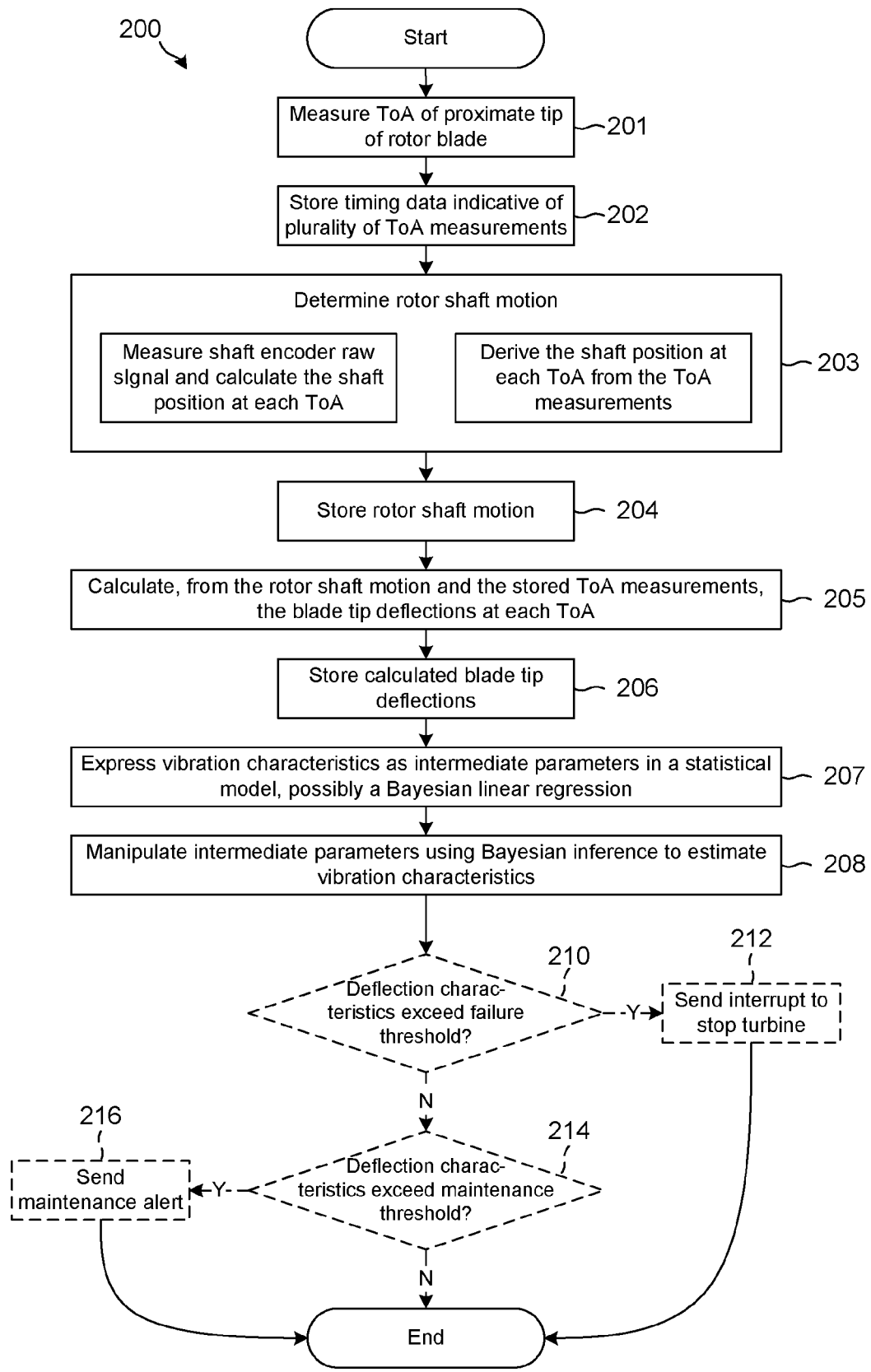
FIG. 2 shows a flow diagram of a method of estimating vibration characteristics of moving rotor blades in a turbomachine, in accordance with the invention.

FIG. 2 shows a (high-level) method 200 of estimating vibration characteristics of moving rotor blades in a turbomachine. The method 200 comprises measuring (at block 201) a ToA of a proximate rotor blade tip. FIG. 3 illustrates this in a little more detail. The sensor 102 is used to measure a signal that gets used to trigger a ToA measurement as the tip of a deflected rotor blade $R_1$ passes by. The ToA of the deflected tip will be fractionally different compared to the ToA had the rotor blade not been deflected. The shaft motion is estimated (at block 203) either based on measurements from the shaft encoder 103 or derived based on the ToA measurements from multiple sensors and/or multiple revolutions. The ToA had the blade not been deflected is estimated through the estimated shaft motion.

The control module 112 stores (at blocks 202 and 204) the ToA measurements and the shaft motion estimations in a memory module provided by the computer-readable medium 120 for processing. Also, the stored measurements may be reviewed later for auditing or record keeping purposes. The stored ToA measurements and the shaft motion estimations are then manipulated by the control module 112 to calculate blade tip deflections at each ToA. The control module 112 stores (at block 206) the calculated tip deflections in a memory provided by the computer-readable medium 120 for processing. The vibration characteristics are then expressed (at block 207) by the control module 112 as intermediate model parameters in a statistical model such as a Bayesian linear regression model (e.g., using Eq. 1) or any other appropriate Bayesian probabilistic model. Importantly, these intermediate parameters are then manipulated (at block 208) using Bayesian inference in accordance with the data processing module 122, thereby to estimate the most probable vibration characteristics. The manipulation (at block 208) may use all of the information already stored.

By way of development, the control module 112 can be configured not merely to estimate rotor blade vibration but also to take corrective action. For example, if the estimated vibration levels exceeds (at block 210) a failure threshold, this may indicate that the turbine 10 is vulnerable to a catastrophic failure, the consequences of which may be dire. The control module 112 could be configured merely to send a failure alert but in this example is configured to send (at block 212) an interrupt message to a control system of the turbine 10 automatically to stop or slow down the turbine 10.

If the estimated vibration characteristics do not exceed a failure threshold but do exceed a maintenance threshold (at block 214), this may indicate that the turbine 10 is still safe to operate but that preventative maintenance should be undertaken. The control module 112 sends (at block 216) a maintenance alert message to a designated recipient, e.g., a turbine administrator.

The control module 112 may also analyse long term trends in the ToA and inferred vibration model coefficients and determine on this basis that predictive maintenance should be performed. The control module 112 sends (at block 216) a maintenance alert message to a designated recipient, e.g., a turbine administrator.

By way of a more thorough explanation, the expression and manipulation of the tip deflection data (blocks 207-208) in the data processing model 122 will now be described in more detail. The expression (block 207) assumes, as one possibility, a SDoF (single degree of freedom) model for blade vibration. The amplitude and phase are expressed, indirectly, as parameters in a linear regression model and are then calculated using Bayesian linear regression.

Suppose, as one possible example, the blade vibration model is chosen as shown in Eq. 2.

$$z_m(t) = A_m \sin(EO\Omega(t)) + B_m \cos(EO\Omega(t)) \qquad (2)$$

Figure 4:
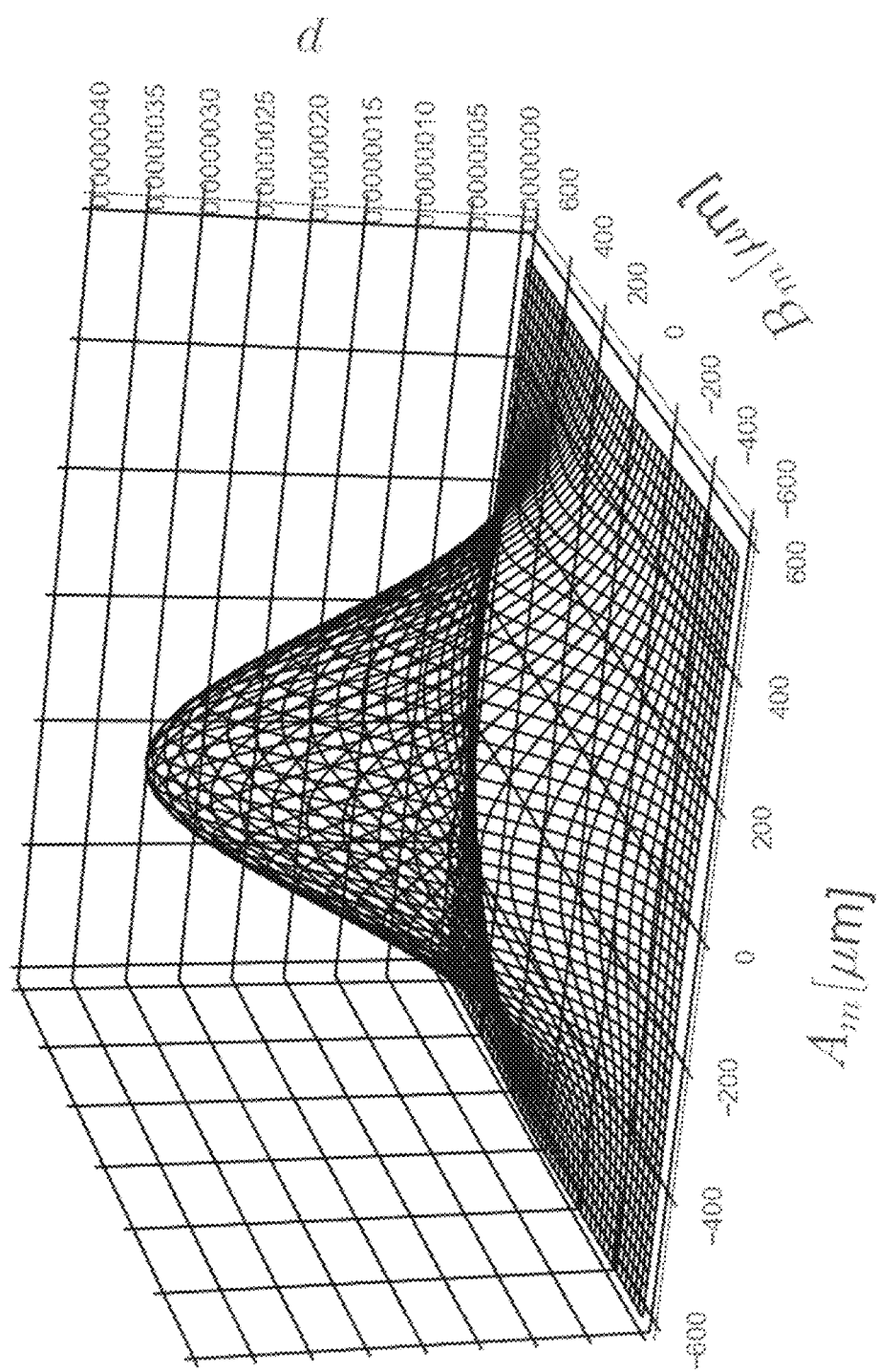
FIG. 4 shows a three-dimensional graph of the prior probability distribution given by Eq. 4.

In Eq. 2, $z_m$ is the modelled vibration tip displacement in shaft revolution m. The shaft revolution m is a counter variable starting at 1 denoting the first revolution of the analysis and stopping at M, which is the final revolution of the analysis. The assumed vibration model for each shaft revolution m has the same form but will have different solutions. The rotor speed at time t is denoted by Ω where Ω is in units of radians/second. The term EO is called the vibration Engine Order (EO) and is a parameter used to scale the rotor speed to the vibration frequency. The terms sin(EO Ω(t)) and cos(EO Ω(t)) are called the basis functions of the model. The assumed model parameters in this example are $A_m$ and $B_m$, these two parameters represent the vibration amplitude and phase, if the transformations in Eq. 3 and Eq. 4 are applied:

$$\text{Amp}_m = \sqrt{A_m^2 + B_m^2} \tag{3}$$

$$\text{Phase}_m = \arctan\left(\frac{B_m}{A_m}\right) \tag{4}$$

Where $\text{Amp}_m$ and $\text{Phase}_m$ are the amplitude and phase of vibration respectively. Using Bayesian linear regression or Bayesian modelling and inference requires prior information to be added to what the assumed model parameters could be. The prior information is an initial estimate of the assumed model parameters before considering the measured data. The prior information can be uninformative, as is often the case. Another common choice for prior information is a multivariate Gaussian distribution. The prior information assumed for this vibration model takes the form of the multivariate Gaussian distribution in Eq. 4.

$$p(x_m) = \frac{1}{(2\pi)} \frac{1}{|\Sigma|^{1/2}} \exp\left(-\frac{1}{2}(x_m - 0)^T \sum_m^{-1} (x_m - 0)\right) \tag{4}$$

$$x_m = \begin{pmatrix} A_m \\ B_m \end{pmatrix} \tag{5}$$

where 0 is a vector of two 0's and $\Sigma_m$ is calculated by Eq. 6

$$\sum_m = \begin{pmatrix} \sigma_p^2 & 0 \\ 0 & \sigma_p^2 \end{pmatrix} \tag{6}$$

where $\sigma_p$ is a parameter that governs the variance of the prior information distribution. The prior probability distribution in Eq. 4 as a function of the assumed model parameters, with $\sigma_p$=200 μm, is illustrated graphically in FIG. 4.

The next step of expressing the vibration characteristics as a statistical model (at block 207), is to specify the likelihood function. The likelihood function determines the probability of the measured tip deflection data being created by the vibration model (Eq. 2) with specific values for the assumed model parameters ($A_m$ and $B_m$). The model is chosen here as a univariate (or single variable) Gaussian distribution with mean equal to $z_m(t)$ (defined in Eq. 2) and a parameter equal to each measured tip deflection for a blade in revolution m. This is illustrated in Eq. 6.

$$p(y(t_{m,i}) \mid x_m) = \frac{1}{(2\pi\sigma_y^2)^{1/2}} \exp\left(-\frac{1}{2\sigma_y^2}(y(t_{mi}) - z_m(t_{mi}, x_m))^2\right) \tag{6}$$

In Eq. 6, $t_{m,i}$ denotes the ToA of the specific blade during revolution m at sensor number i in the casing, $y(t_{m,i})$ denotes the measured tip deflection corresponding to time $t_{m,i}$, and $z_m(t_{m,i}, x_m)$ is obtained from Eq. 2 (the dependence on the model parameter $x_m$ is stated explicitly in Eq. 6). The standard deviation of the likelihood function is $\sigma_z$ and can be determined from prior experience or iteration. The likelihood functions for each ToA in m is multiplied to one another to obtain the likelihood function of the entire revolution m. This likelihood function is given in Eq. 7.

$$p(y_m \mid x_m) = \left(\frac{1}{(2\pi\sigma_y^2)^{\frac{1}{2}}}\right)^S \left(-\frac{1}{2}(y_m - \Phi_m x_m)^T L_m^{-1}(y_m - \Phi_m x_m)\right) \tag{7}$$

where $y_m$ is a vector of all measured tip deflections in revolution m, S is the number of sensors in the casing (and therefore the number of tip deflection measurements for a blade during a revolution), $\Phi_m$ is called the design matrix and is given by Eq. 8

$$\Phi_m = \begin{pmatrix} \sin(EO\Omega(t_{m,0})) & \cos(EO\Omega(t_{m,0})) \\ \vdots & \vdots \\ \sin(EO\Omega(t_{mS})) & \cos(EO(t_{mS})) \end{pmatrix} \tag{8}$$

The design matrix is therefore a matrix containing all the basis functions for the assumed vibration model (Eq. 2) for all measured tip deflections during revolution m. The covariance matrix $L_m^{-1}$ of the likelihood function is given by Eq. 9

$$L_m^{-1} = \frac{1}{\sigma_y^2} I \tag{9}$$

where I is the identity matrix with the same number of rows and columns as there are model parameters in $x_m$.

Finally, Bayes' theorem is used to manipulate the intermediate parameters (at block 208) to yield the posterior distribution, or final estimate, of the model parameters. Bayes' theorem as applied to this statistical model is shown in Eq. 10.

$$p(x_m \mid y_m) = \frac{p(y_m \mid x_m) p(x_m)}{p(y_m)} \tag{10}$$

The posterior distribution evaluates to Eq. 11.

$$p(x_m \mid y_m) = \mathcal{N}(x_m \mid \mu_m, M_m) \tag{11}$$

where $\mathcal{N}$ is the shorthand notation for a Gaussian distribution and $\mu_m$ (not to be confused with μ used in a unit to denote micro) is the mean of the posterior distribution given by Eq. 12:

$$\mu_m = \frac{1}{\sigma_y^2} M_m \Phi_m^T y_m \tag{12}$$

and $M_m$ is the covariance matrix of the posterior distribution given by Eq. 13:

$$M_m = \left(\frac{1}{\sigma_p^2}I + \frac{1}{\sigma_y^2}\Phi_m^T\Phi_m\right)^{-1} \quad (13)$$

The term $p(y_m)$ in Eq. 10 is the model evidence and is an indication of how well the probabilistic model fits the data. The model evidence for this illustration is given in Eq 14.

$$p(y_m) = \mathcal{N}(y_m|0, \sigma_y^2 I + \sigma_p^2 \Phi_m \Phi_m^T) \quad (14)$$

Figure 5:
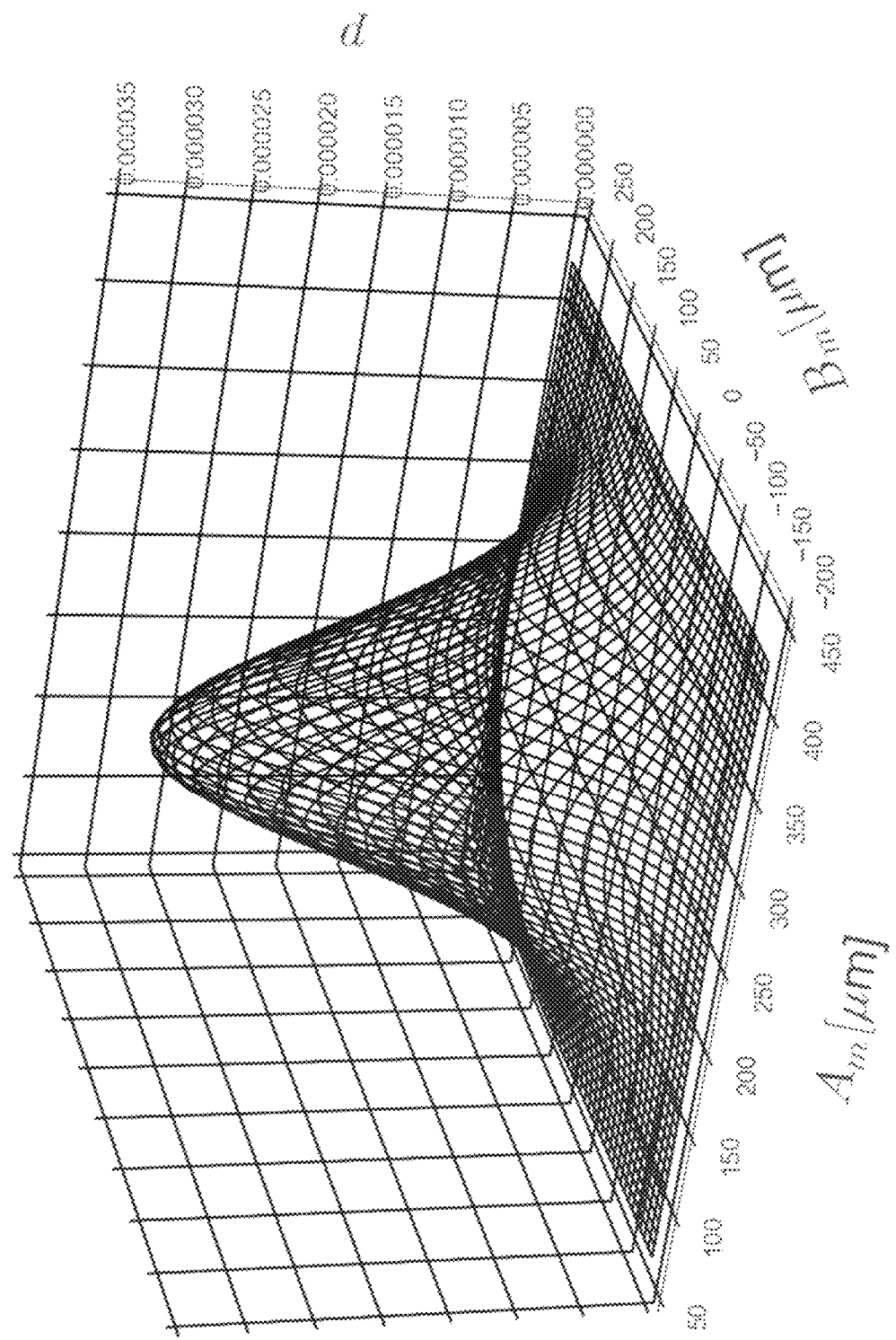
FIG. 5 shows a three-dimensional graph of the posterior probability distribution given by Eq. 11.
Figure 6:
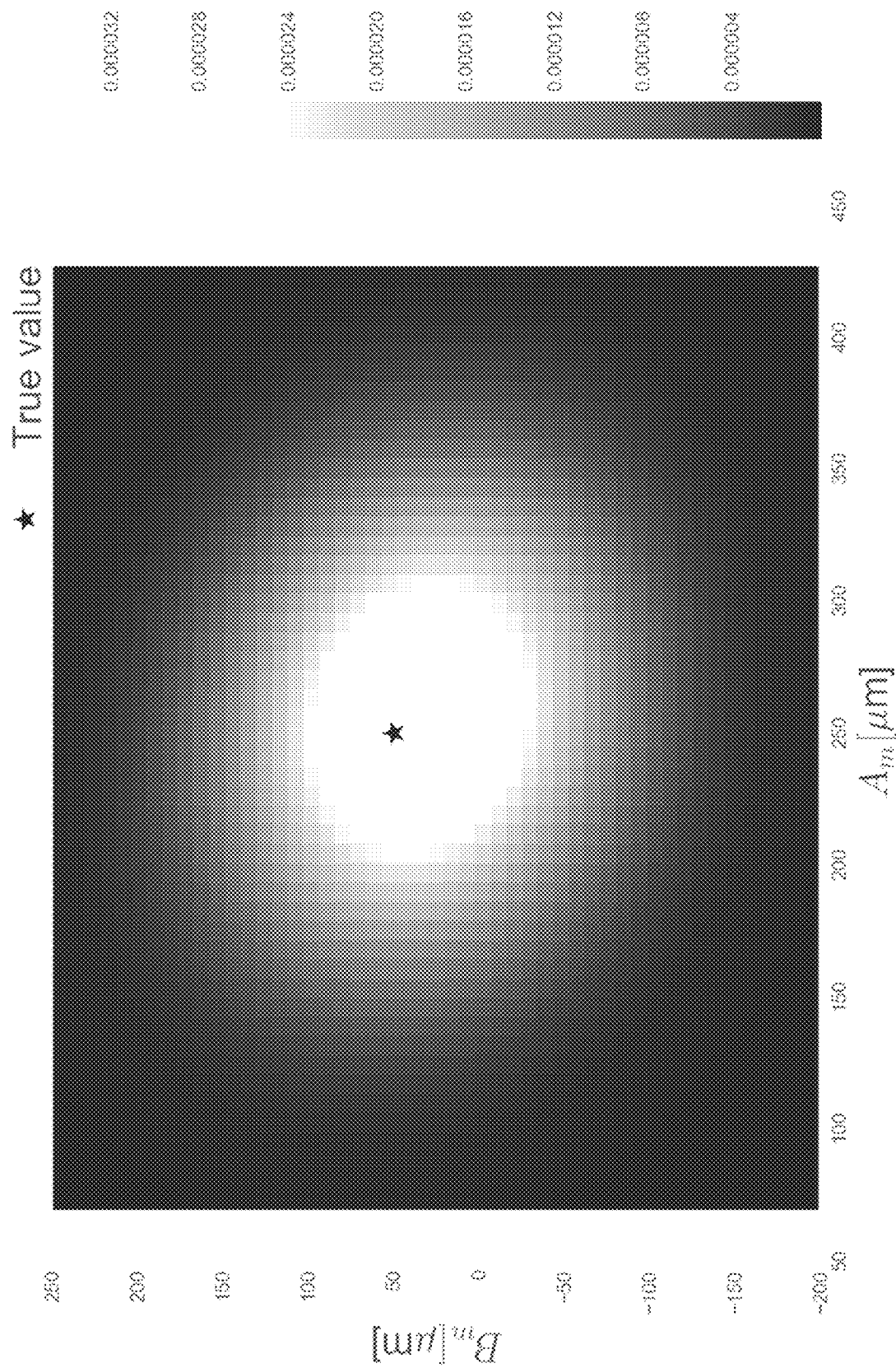
FIG. 6 shows a two-dimensional graph of the posterior probability distribution given by Eq. 11.

As an illustration, take the following case. A rotor blade is vibrating with a vibration model as shown in Eq. 15.

$$x(t) = 250 \sin(6 \times 134.0 \times t) + 50 \cos(6 \times 134.0 \times t) + \in \mu m \quad (15)$$

where $\in$ is a random noise term that simulates the noise that the BTT system measures along with the true blade tip deflection. The noise term is distributed according to Eq. 16.

$$\in \sim U[-50, 50] \mu m \quad (16)$$

where $U[-50,50]$ is a uniform probability distribution between a lower bound of $-50$ μm and an upper bound of 50 μm. Eq. 14 corresponds to a blade vibrating at an EO of 6 where the rotor has a constant speed of 134 radians/second, which is approximately 1279.6 Revolutions Per Minute (RPM). A BTT system with four sensors measures and stores (through steps 201-206) the following tip deflections: $y_{1,1}=149.30$ μm, $y_{1,2}=202.65$ μm, $y_{1,3}=-252.90$ μm and $y_{1,4}=-275.35$ μm at the ToA's $t_{1,1}=1.00115409573$ s $t_{1,2}=1.00293589555$ s, $t_{1,3}=1.00512588586$ s and $t_{1,4}=1.00652397359$ s. The vibration parameters can be estimated using a statistical model with $\sigma_y=100$ μm and the prior information the same as used for FIG. 4. The posterior distribution, i.e. the final estimate, of the assumed model parameters is shown in FIG. 5 in 3D as well as a 2D representation in FIG. 6 (where the probability is indicated with the colourbar on the right of FIG. 6). The true vibration parameters from Eq. 14 is indicated with a star marker on FIG. 6. The colourbar on the right of the figure can be used to determine the probability density.

Figure 7:
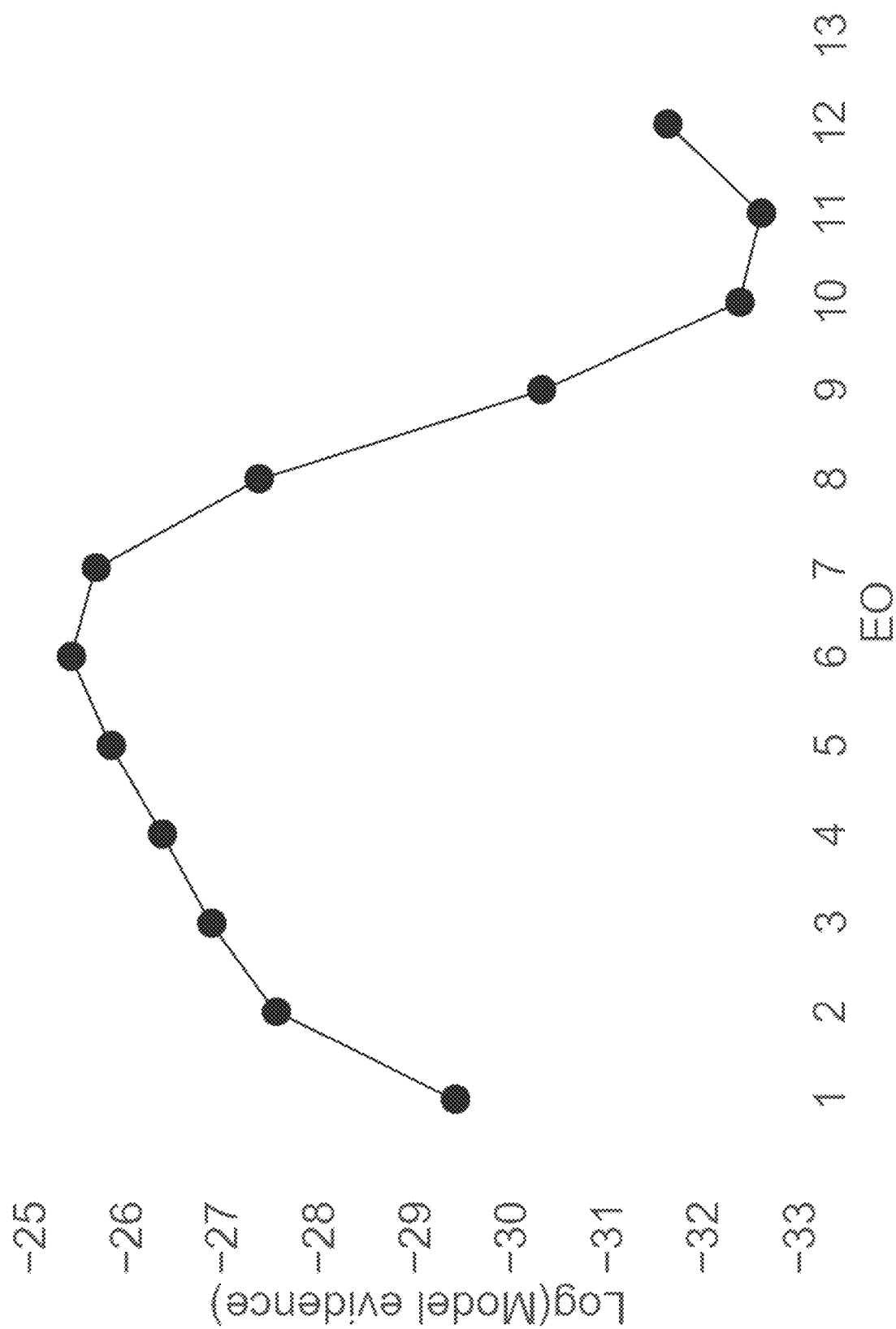
FIG. 7 shows a graph of the logarithm model evidence when using different EO values with the method of FIG. 2 to analyse the BTT signals as measured for the vibration model specified in Eq. 15 and the paragraph thereafter.

It is seen that the true vibration parameter lies within a high probability region of the posterior estimate of the model parameters. The true EO might not be known beforehand. An appropriate goodness-of-fit criterion can be used to evaluate the accuracy of the probabilistic model for different EO values. The model evidence, given in Eq. 13 can be used. A larger model evidence indicates a more likely EO. The model evidences for EO's 1 to 12 for the current example are shown in FIG. 7. It is seen that EO=6 has the highest value of log model evidence and is therefore the most likely EO of vibration.

Numerical Illustration of Setting an Alarm Threshold Using the Probabilistic Vibration Parameters One of the tasks BTT can be used for is to alert the turbomachine operator (whether that is a human operator, control system etc.) of excessive blade vibration. The vibration amplitude can be used as an indicator to this end. BTT signals are, however, inherently aliased and contain large amounts of noise. The present method 200 can be used to specify a probabilistic amplitude threshold that indicates excessive vibration. This probabilistic amplitude threshold may be more robust that an equivalent, deterministic threshold.

Take, as an illustration, the vibration model in Eq. 15. The true amplitude of vibration is 254.95 μm according to Eq. 3. Suppose it has been determined that this amplitude and anything above this amplitude constitutes excessive vibration that is damaging to the rotor blades. The conventional approach for triggering an alarm based on this excessive vibration might be to solve the vibration amplitude deterministically. All the prior art methods cited previously are deterministic. A common method might be to use the equation in Eq. 17.

$$x_m = \Phi_m^{-1*} y_m \quad (17)$$

where $\Phi_m^{-1*}$ denotes the Moore-Penrose pseudoinverse of the design matrix specified in Eq. 8. If one were to use the deterministic estimate of $x_m$, there may be many cases where the threshold is not triggered due to noise in the raw BTT measurement leading to a lower amplitude inference than the true amplitude. This underestimation may occur frequently. Moreover, there is no way to determine how close or far the estimated amplitude may be to the threshold because one does not have any uncertainty information for the amplitude estimate.

This lack of warning can lead to excessive damage to the rotor blade, because the operator will not intervene to change the operating condition of the turbomachine.

Figure 8:
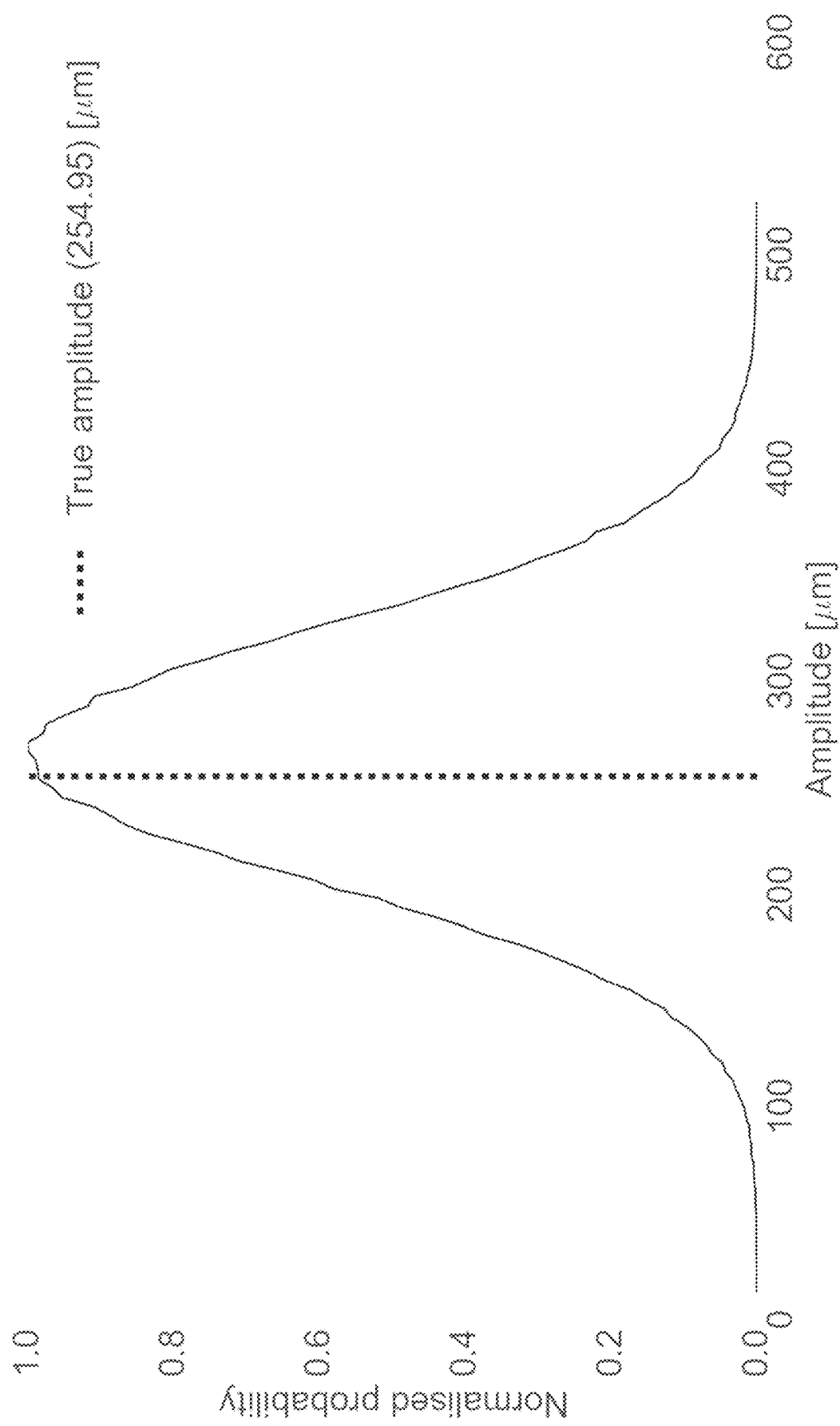
FIG. 8 shows a graph of the probability density of the vibration amplitude as inferred by the method of FIG. 2 on the vibration data specified in Eq. 15.

The present method 200 allows one to express the inferred model parameters as a probabilistic amplitude estimate. The probability distribution function for the vibration amplitude based on the inferred vibration model in Eq. 11 is shown in a graph of FIG. 8. The graph has been normalised such that its maximum value is equal to 1. This was done to increase the readability of the graph. One can then set a probabilistic threshold on excessive vibration. For instance, one can set an alarm to trigger when there is a 30% or more probability that the vibration exceeds 254.95 μm.

The comparative advantage of the present method 200 with a probabilistic threshold as opposed to a prior art method using a deterministic threshold is illustrated through a simulation. BTT measurements for 1000 simulations of Eq. 14 is taken, and excessive vibration alarms are set according to the following two methods:

Prior art: solve the amplitude deterministically and trigger an alarm when the amplitude has exceeded 254.95 μm.

Present method 200: solve the amplitude probabilistically and trigger an alarm when there is a 30% or more chance of the vibration exceeding 254.95 μm.

Figure 9:
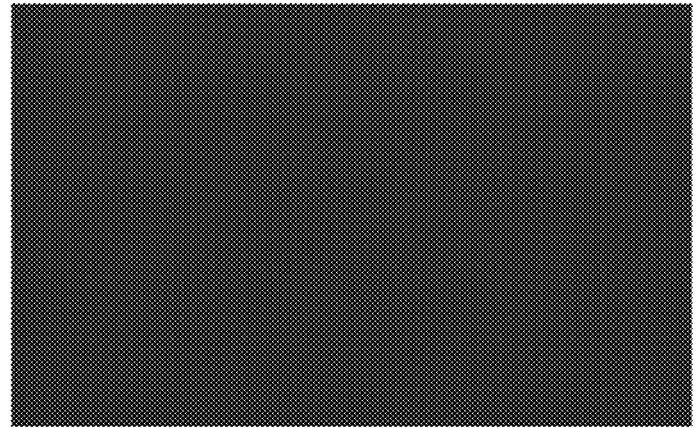
FIG. 9 shows a chart indicating the number of alarms raised because of excessive vibration due to using a prior art deterministic vibration amplitude threshold vs. using a probabilistic vibration amplitude threshold according to the method of FIG. 2.
Figure 9:
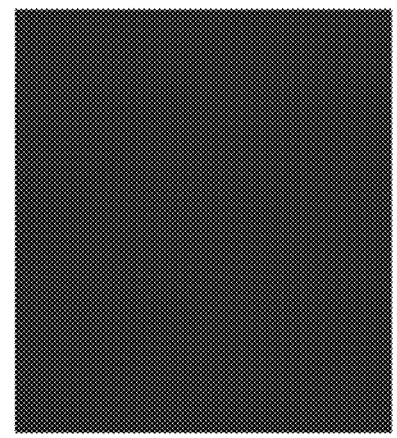
Figure 9:
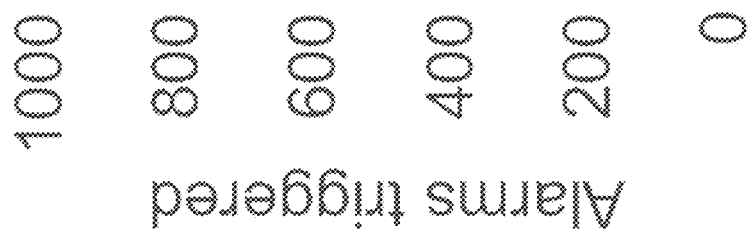

The number of times that the alarm has been triggered using the two techniques are shown in FIG. 9. The prior art method triggers the alarm only 550 times, 55% of the time. The present method 200 with a probabilistic threshold triggers the alarm 991 times, or 99.1% of the time. The operator would therefore have been informed many more times of damaging scenarios using the present method 200, thus allowing him/her/it to mitigate the risk of damage to the blades.

Additional Illustration of the Present Method Vs. Prior Art

To illustrate the present invention on a different assumed vibration model than used in Eq. 2, simulated and experimental results are now reported. The method 200 assumes an SDoF model for blade vibration with the amplitude, phase and DC offset terms expressed as parameters in a linear regression model and are then calculated using Bayesian linear regression.

Consider blade vibration of the turbine 10 (or any other turbomachine) to be described by Eq. 1. Given a set of N blade displacements, each one denoted by $x_i$, and collectively denoted by the column vector x, and a corresponding set of ToA measurements, each denoted by $t_i$ in the design matrix, the model parameters A, B and C can be calculated by Eq. 18:

$$w = \beta S_N \Phi^T x \quad (18)$$

In Eq. 18, $w=(A\ B\ C)^T$. The term $\beta$ in Eq. 18 is a precision parameter controlling the algorithm's tolerance to noise in the sampled data. The precision matrix (inverse of the covariance matrix) of the model parameters is calculated using Eq. 19:

$$S_N^{-1}=\alpha I+\beta\Phi^T\Phi) \quad (19)$$

In Eq. 19, I is the identity matrix. The parameter $\alpha$ is a precision parameter controlling the standard deviation of the prior distribution for the model parameters A, B and C. In this implementation of Bayesian linear regression or Bayesian modelling and inference, $\alpha$ will be very small, indicating the prior distribution is approximately uninformative. The standard deviation of the parameters is only of interest for calculating the mean, and is not informative by itself, unless the values of $\beta$ and $\alpha$ can be determined from physical principles. The final equation required is to calculate the design matrix, $\Phi$, calculated from Eq. 20:

$$\Phi = \begin{bmatrix} \cos\omega t_1 & \sin\omega t_1 & 1 \\ \vdots & \vdots & \vdots \\ \cos\omega t_N & \sin\omega t_N & 1 \end{bmatrix} \quad (20)$$

A difference between the present method 200 and the prior art AR method is that while the AR method calculates the frequency of vibration, the present method 200 receives the frequency of vibration as an input parameter and then calculates the optimum values for the parameters A, B and C of Eq. 1. The method 200 may be implemented for any possible vibration frequency, $\omega$, which is sometimes expressed as an integer multiple, or EO of the shaft speed and after each inference, the probability of that $\omega$ being the correct one can be calculated using Eq. 21. Eq. 21 indicates a goodness-of-fit criterion that can be used to assess how accurate the determined model coefficients are. Note that this is a different goodness-of-fit criterion than used in Eq.14.

$$p(\omega)\propto\Pi_{i=1}^N \mathcal{N}(t_i|x(t_i),\sigma^2(t_i)) \quad (21)$$

In Eq. 21, $x(t_i)$ refers to the application of Eq. 1 after the parameters A, B and C have been determined from Eq. 18 using $\omega$. Note that Eq. 21 only expresses the probability of $\omega$ to be proportional to the right side of Eq. 21. This is because the value of $\omega$ is, in this specific implementation, only allowed to take on discrete values (different Eos multiplied by the rotor rotational speed), and after all the discrete probabilities have been determined, they can be normalised to add up to one.

The variance $\sigma(t_i)^2$ can be calculated from Eq. 22:

$$\sigma^2(t_i) = \frac{1}{\beta} + (\cos\omega t_i \sin\omega t_i\ 1)S_N\begin{pmatrix}\cos\omega t_i \\ \sin\omega t_i \\ 1\end{pmatrix} \quad (22)$$

It has previously been noted that the AR method requires the proximity probes to be spaced equidistant from one another. The present method 200 bears no such requirement; sensors 102 can be placed anywhere. The present method 200 performs at its best when the sensors are spaced at irregular intervals from one another.

Numerical Illustration of Present Invention Vs. Prior Art

For illustrating how the present method 200 and prior art AR methods perform, a simple numerical experiment is performed. The following conceptual turbine is considered:

The shaft speed is a constant $\Omega=25$ Hz.

The outside diameter of the blades is 325 mm.

For the present method 200, four proximity probes will be positioned at 22.5°, 52.5°, 72.2° and 109° respectively. In this frame of reference for the turbine, 0° is located at the top of the turbine.

For the AR model, the four proximity probes will be positioned at 22.5°, 45°, 67.5° and 90° respectively.

Three different vibrational states of the blade being measured are considered:

Sinusoidal vibration with an amplitude of 0.1 mm.

Sinusoidal vibration with an amplitude of 0.1 mm and a DC offset of 0.02 mm.

Sinusoidal vibration with an amplitude of 0.1 mm with an additional sinusoidal term. The additional term vibrates at a frequency of EO=50 and amplitude of 0.02 mm.

For each of these three vibrational states, three different EOs will be considered, they are EO=4, 9, and 24.

For each of the cases, Gaussian white noise will be added at increasingly large signal to noise ratios. The size (standard deviation) of the noise will be 0, 1, 5 and 10% of the amplitude.

For the Bayesian probabilistic model 207, the precision parameters are: $\beta=10E^8$ and $\alpha=1E^{-3}$ Because of the stochastic nature of the added noise, each case needs to be repeated several times to get a statistical average performance of the method. Each case is be repeated 30 times. For the present method 200, the following will be reported:

The average error percentage on the amplitude estimate.

The three most probable EOs. The EO with the highest probability will appear in the EO1 column, the EO with the second highest probability will appear in the EO2 column, and the third highest in the EO3 column.

For the prior art AR method, the following will be reported:

The average error percentage on the amplitude estimate.

The average error percentage on the frequency estimate.

Results

Table 1 summarises the results of the numerical experiment on the first type of vibration, sinusoidal vibration with an amplitude of 0.1 mm.

TABLE 1

Numerical experiment results for sinusoidal vibration without a DC offset.

| EO | Noise (% of Amplitude) | Present method 200 | | | | Prior art AR method | |
|---|---|---|---|---|---|---|---|
| | | Amplitude Error [%] | EO1 | EO2 | EO3 | Amplitude Error [%] | Frequency Error [%] |
| 4 | 0[1] | 0 | 42 | 50 | 4 | 0.35 | 2.82 |
| | 1 | 2.21 | 4 | — | — | 2.98 | 2074.62 |
| | 5 | 4 | 18 | 46 | 4 | 34.36 | 2474.34 |
| | 10 | 28.07 | 1 | 18 | 37 | 42.08 | 2139.3 |
| 9 | 0 | 0 | 21 | 20 | 9 | 0.54 | 199 |
| | 1 | 0.98 | 9 | 20 | — | 2.83 | 3632.011 |
| | 5 | 21.55 | 25 | 50 | 20 | 43.27 | 3756.47 |
| | 10 | 9.58 | 50 | 22 | 4 | 82.65 | 3388.5 |
| 24 | 0 | 0 | 48 | 12 | 36 | 41.21 | 1598.52 |
| | 1 | 1.24 | 22 | 36 | — | 27.47 | 2195.53 |
| | 5 | 4.2 | 18 | 22 | 14 | 52.08 | 2112.73 |
| | 10 | 20.41 | 18 | 40 | 17 | 38.19 | 1650.06 |

[1]For noise values of 0%, only one inference is conducted per dataset. The three EOs that is listed in the present method 200 correspond to the three most probable EOs.

The following can be observed and concluded:
In all situations where noise is absent, the present method 200 produces the exact amplitude of vibration. For an EO of 4 and 9, the correct frequency is among the top 3 most probable frequencies in most noise levels.

The prior art AR method produces accurate results for amplitude and frequency for EO=4 in the absence of noise. The AR method fails to produce any other accurate frequency estimates over all EOs, indicating that the PSR (Prove Spacing on the Resonance) is much too small for the AR method to work properly. Even though the AR method fails at estimating the frequency of vibration, it generally produces accurate results for the amplitude inference, inferring within 5% for small noise levels and below 50% error for large noise levels.

The present method 200 generally produces accurate amplitude estimates even for the largest noise ratio.

Neither method accurately and confidently predicts the frequency of vibration. An experimental illustration of the present invention 200 will be presented later where the present method 200 has used a slightly different Bayesian Probabilistic Model that determined the vibration frequency successfully and to a high accuracy.

Table 2 lists the numerical experiment results for sinusoidal vibration with a DC offset of 0.02 mm.

TABLE 2

Numerical experiment results for sinusoidal vibration with DC offset.

| | Noise (% of | Present method 200 | | | | Prior art AR method | |
|---|---|---|---|---|---|---|---|
| EO | Amplitude) | Amplitude Error [%] | EO1 | EO2 | EO3 | Amplitude Error [%] | Frequency Error [%] |
| 4 | 0 | 0 | 42 | 50 | 4 | 0.35 | 2.81 |
|  | 1 | 0.92 | 4 | — | — | 7.92 | 1905.5 |
|  | 5 | 10.62 | 50 | 17 | 33 | 40.22 | 2834.22 |
|  | 10 | 9.52 | 25 | 4 | 5 | 27.23 | 2528.61 |
| 9 | 0 | 0 | 48 | 12 | 36 | 41.45 | 1598.52 |
|  | 1 | 1.06 | 36 | — | — | 36.6 | 2415.63 |
|  | 5 | 6.08 | 22 | 23 | 36 | 34.06 | 1641.35 |
|  | 10 | 28.68 | 22 | 7 | 24 | 106.41 | 1823.04 |
| 24 | 0 | 0 | 21 | 20 | 9 | 0.54 | 199 |
|  | 1 | 1.64 | 50 | 9 | 21 | 2.64 | 3478.34 |
|  | 5 | 6.31 | 9 | 50 | 20 | 30.98 | 3719.58 |
|  | 10 | 24.79 | 43 | 15 | 40 | 32.72 | 3369.36 |

The results observed in Table 2 show similar behaviour to the results from Table 1. One could note that the amplitudes determined by the prior art AR method are slightly less accurate than in Table 1. The present method 200 produces similar results.

Table 3 lists the numerical experiment results of sinusoidal vibration with a secondary frequency component present at 50 EO with an amplitude of 0.02 mm.

TABLE 3

Numerical experiment results for sinusoidal vibration with an additional 50 EO sinusoidal frequency term.

| | Noise (% of | Present method 200 | | | | Prior art AR method | |
|---|---|---|---|---|---|---|---|
| EO | Amplitude) | Amplitude Error [%] | EO1 | EO2 | EO3 | Amplitude Error [%] | Frequency Error [%] |
| 4 | 0 | 8.85 | 46 | 4 | 18 | 1000100 | 400.63 |
|  | 1 | 9.33 | 18 | 4 | — | 880.96 | 613.39 |
|  | 5 | 7.83 | 50 | 4 | 18 | 65.35 | 2175.7 |
|  | 10 | 14.24 | 17 | 40 | 18 | 106.1 | 3783.95 |
| 9 | 0 | 11.18 | 21 | 9 | 50 | 1000100 | 900.64 |
|  | 1 | 11.3 | 9 | 50 | — | 214.13 | 3953.53 |
|  | 5 | 5.79 | 29 | 9 | 20 | 75.48 | 3777.2 |
|  | 10 | 9.38 | 50 | 46 | 29 | 36.84 | 3541.26 |
| 24 | 0 | 4.57 | 15 | 22 | 23 | 1000100 | 2400.64 |
|  | 1 | 6.03 | 23 | — | — | 97.71 | 1492.81 |
|  | 5 | 14.8 | 7 | 23 | 14 | 62.33 | 768.87 |
|  | 10 | 31.76 | 7 | 15 | 14 | 60.17 | 580.09 |

From Table 3 the following conclusions can be made:

The prior art AR method cannot determine the frequency of vibration. The prior art AR method also has far less accurate amplitude estimates than in the previous numerical experiments.

Where the present method 200 could infer exactly the amplitude of vibration in the absence of noise for the previous two cases, it now produces errors. The errors for all estimates are relatively small.

On various occasions, the present method 200 produces the correct EO of vibration among its top three most probable EOs.

In this section, it has been noted that the present method 200 can infer the amplitude of vibration with relative accuracy for most EOs and noise ratios. Where the present method attempts to infer the EO of vibration, it is found that the present method 200 does yield the true EO within its three most probable answers some of the time. The prior art AR method is able to determine the EO and amplitude of vibration for the lowest EO in the absence of noise, but is less accurate for all other cases. The prior art AR method does not provide meaningful results when the blade is undergoing sinusoidal vibration with a secondary vibration component at an EO of 50. This is because the method is a SDoF method, and the mathematics break down when the physical reality is not an SDoF system.

The present method 200 produced relatively accurate results in the third case, even though it is also a SDoF model. The reason for this success is that the algorithm is noise tolerant, and the secondary frequency component is handled as noise. More specifically, it was found in later experimental tests that the present method 200 could detect the vibration frequency within 0.1% accuracy while the prior art AR method generally had errors of 4-6%.

Experimental Illustration of Present Invention Vs. Prior Art

Another illustration for how the present method 200 and prior art AR and CFF methods perform is now presented. A laboratory turbomachine was used to perform this analysis. The characteristics of the turbomachine and the test were:

The shaft speed was a constant $\Omega$=939.42 RPM.

The outside diameter of the blades is 324 mm. The rotor system is constructed out of mild steel with five blades. The first three natural frequencies of the blades at rest are approximately 124.44 Hz, 505 Hz and 750 Hz. Two pressurised air jets projecting the air in the axial direction from behind the blades were used to excite the first natural frequency of the blades. The EO of excitation was 8.

A strain gauge was attached to the root of the rotor blades to independently measure the blade vibration and to determine the accuracy of the present method 200 as well as the prior art AR and CFF methods in determining the vibration characteristics of the blades. Strain gauges can be used in the laboratory environment but not in industrial situations due to harsh operating conditions.

A zebra-tape shaft encoder was used, the zebra tape has 79 sections. An optical encoder was used to measure the zero-crossing times of the alternating black-and-white sections of the zebra tape and these intervals were processed to determine the shaft motion.

Two sets of proximity probes were used for the tests, the first set with four proximity probes spaced at 0°, 13°, 29° and 39°, and the second set with four proximity probes spaced at the equidistant intervals of 0°, 10°, 20° and 30°. In this frame of reference for the turbomachine, 0° is located at the top of the turbine.

The present method 200 as well as the CFF method was applied to results obtained from both proximity probe sets, the AR method was applied to data obtained from the second probe set only, as the probes were located at equidistant intervals and the AR method cannot be applied to data captured from the first probe set where the probes are spaced at non-equidistant intervals.

Figure 10:
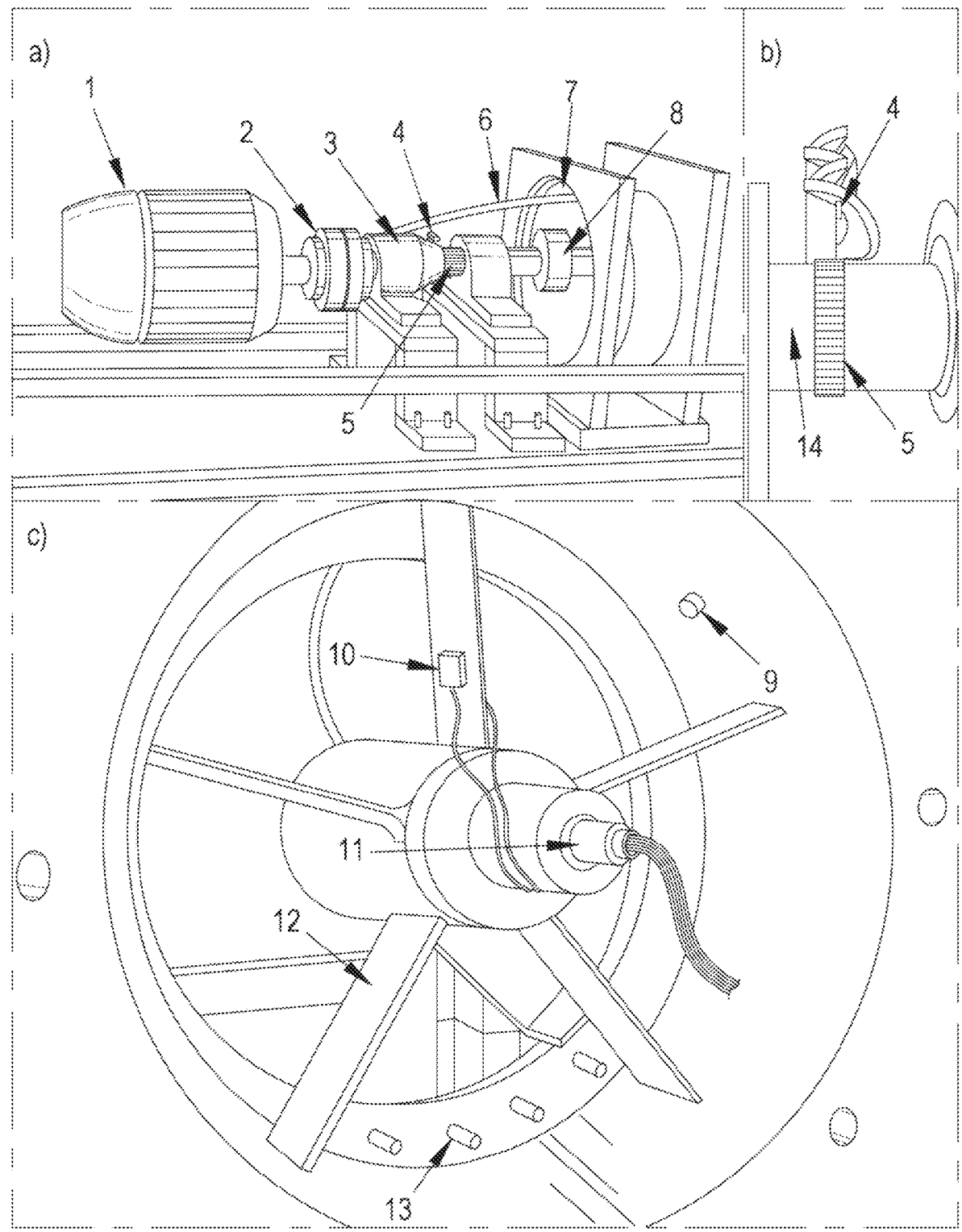
FIG. 10 shows an image of the experimental rotor and additional components used to perform comparative studies between the method of FIG. 2 and prior art methods.
Figure 11:
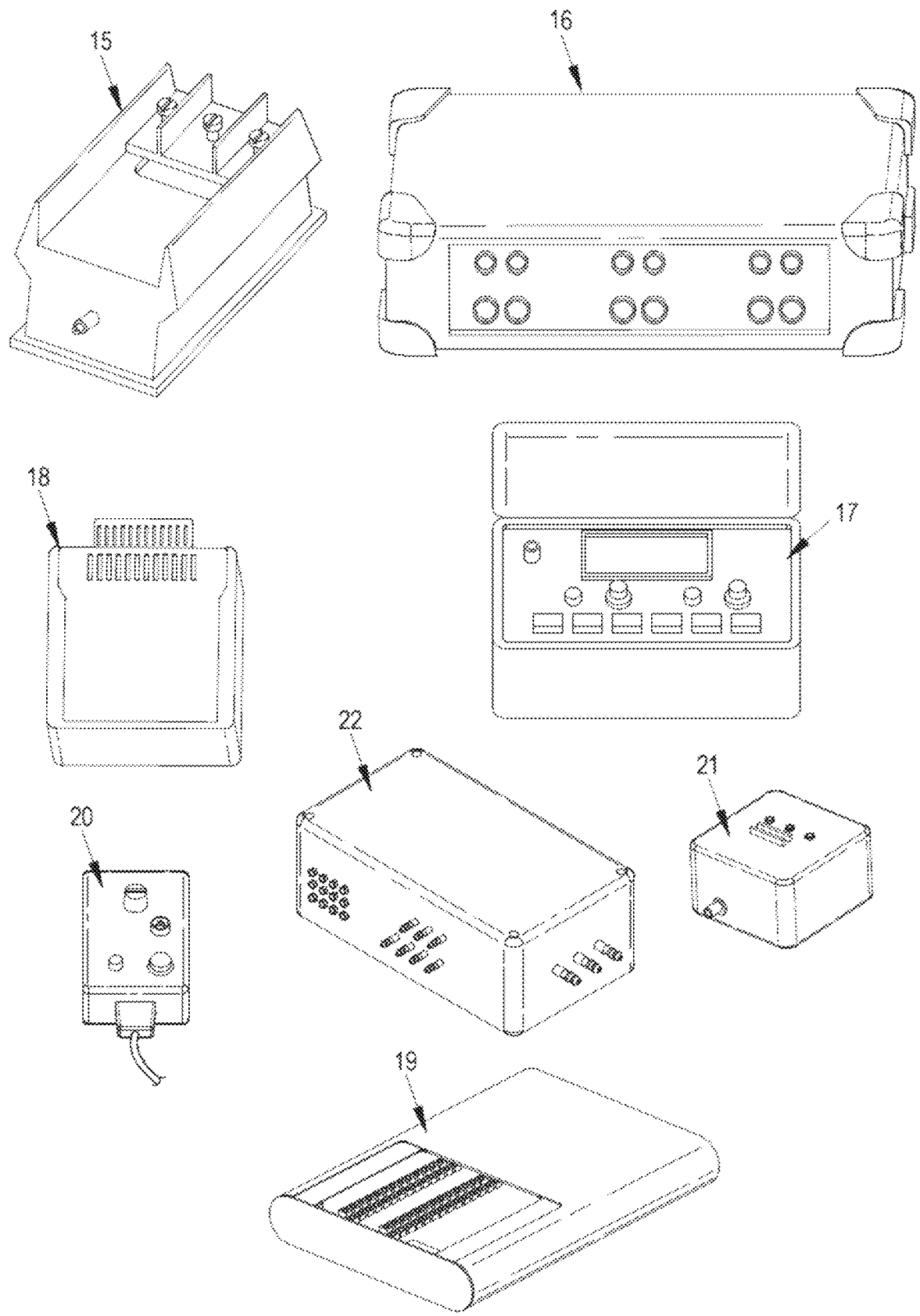
FIG. 11 shows an image of the signal conditioning, signal acquisition and additional electronic components used to perform comparative studies between the method of FIG. 2 and prior art methods.

A lateral view and an axial view of the rotor is given in FIG. 10 with part numbers indicated for the experimental components. All additional electronic equipment for the system are shown in FIG. 11 and a wiring diagram for the equipment is shown in FIG. 12. Two tables indicating the part description, manufacturer and manufacturer part number for the items indicated in FIGS. 10 and 11 respectively are shown in Tables 4 and 5.

TABLE 4

Part information for parts in FIG. 10

| Number | Part description | Manufacturer | Part no. |
| --- | --- | --- | --- |
| 1 | 5.5 kW electric motor | Weg | 132S 06/01 BA38115 |
| 2 | Flexible shaft coupling | Fenner | HRC 150H 2012 |
| 3 | Self aligning bearing (x2) | SKF | SE 511-609 |
| 4 | Optical fibre switch | Optel-Thevon | 152G8 |
| 5 | Zebra tape | Optel-Thevon | — |
| 6 | Air supply pipe | Festo | Pun 8 × 1.25 |
| 7 | Air adaptor fittings | Festo | QS-1/4-8 |
| 8 | Optical encoder | Heidenhain | SIT IN |
| 9 | Eddy current sensor (x5) | Meggit | IQS450 |
| 10 | Strain gauge | Kyowa | KFG-D16-350-11L1M2S |
| 11 | Slip ring | M-Tek | C20 |
| 12 | Blisk | Ancon engineering | — |
| 13 | Air supply nozzle | — | — |
| 14 | 50 mm shaft | Ancon engineering | — |

TABLE 5

Part information for parts in FIG. 11

| Number | Part description | Manufacturer | Part no. |
| --- | --- | --- | --- |
| 15 | Signal conditioning boxes | Meggit | IQS450 |
| 16 | Signal analyser | OROS | OR35 |
| 17 | Strain gauge indicator | Vishay | P-3500 strain indicator |
| 18 | Analogue output device | National Instruments | NI9264 |
| 19 | High-speed data acquisition | National Instruments | NI USB-6366 |
| 20 | Motor controller | In-house | — |
| 21 | Divide-by-10 counter | In-house | — |
| 22 | Signal converter box | In-house | — |

The present method 200 measured the ToAs of the rotor blades and then calculated the rotor tip deflections from the expected arrival time, obtained through the rotor motion as calculated through processing the shaft encoder data, and the actual ToA of the blades.

The present method 200 expressed the tip deflections as a harmonic oscillator like in Eq. 1. The prior probability of the model coefficients was set to an isotropic multivariate Gaussian with a zero mean and a precision parameter $2.5 \times 10^{-5}$. The posterior probability of the model coefficients was obtained from Eq. 2. This process was repeated for various values of $\omega$.

To determine the most probable value for $\omega$, the present method 200 used an optimisation procedure to maximise the probability of Eq. 23 below $$p(\omega|x) = K p(x|\omega) p(\omega) \tag{23}$$

where K is a normalisation coefficient used to normalise the integral under the posterior distribution to 1, $p(\omega|x)$ represents the posterior probability for the vibration frequency $\omega$ to have generated all the tip deflections, collectively denoted by x, and $p(x|\omega)$ is the likelihood function as expressed by Eq. 24 and $p(\omega)$ is the natural frequency prior probability as expressed in Eq. 25.

$$p(x|\omega) = \left(\frac{\beta}{2\pi}\right)^{N/2} \exp\left(-\frac{\beta}{2}\sum_{i=1}^{M}(x_i - A\cos(\omega C_i) - B\sin(\omega t_i) - C)^2\right) \tag{24}$$

$$p(\omega) = \frac{1}{M}\left(\frac{1}{2\pi\sigma_{prior}^2}\right)^{\frac{1}{2}}\sum_{i=1}^{M}\exp\left(-\frac{1}{\sigma_{prior}^2}(\omega - \omega_j)^2\right) \tag{25}$$

The coefficients' mean of the posterior distribution for the coefficients A, B and C are determined by Eq. 18 and the covariance function is determined by Eq. 19 and the ToAs are denoted by $t_i$. The parameter N denotes the number of measured tip deflections used in the probabilistic inference of the vibration characteristics. The coefficients A, B and C as seen in Eq. 23 only uses the mean values but it is entirely conceivable to construct a goodness-of-fit criteria that uses the entire posterior distribution. The coefficients in Eq. 24 are $\beta = 2.5 \times 10^{-3}$, M=3, $\sigma_{prior}=20$, $\omega_1=124.3$ Hz, $\omega_2=513.6$ Hz and $\omega_3=772.26$ Hz.

It is entirely possible to use a different set of prior, likelihood and posterior functions than those in Eqs. 23-25 above. It is also entirely possible to use any appropriate method to determine $\omega$, not just an optimization routine that seeks to determine the highest posterior value, one example of an alternative method is to use a Monte Carlo sampling technique. The present method 200 was applied as described above on various sets of N rotor blade tip deflection measurements. The most probable vibration frequency and amplitude was taken for each probabilistic inference as described by Eq. 23 and the averages and standard deviations were calculated and compared to the answers of the prior art methods.

Results

Table 6 shows the results of the experimental test.

TABLE 6

Comparison between accuracies of the present method 200 and prior art methods CFF and AR for the experimental test case.

| Method | Error in freq. estimate [%] | | Error in amplitude estimate [%] | |
|---|---|---|---|---|
| | Average | Standard deviation | Average | Standard deviation |
| CFF on probe set 1 data | — | — | 16.96 | 2.84 |
| CFF on probe set 2 data | — | — | 47.21 | 2.99 |
| Present method 200 on probe set 1 data | −0.07 | 0.02 | 13.13 | 2.16 |
| Present method 200 on probe set 2 data | −0.02 | 0.02 | 14.07 | 1.09 |
| AR method on probe set 1 data | 6.78 | 0.56 | 11.54 | 2.27 |

It can be seen from Table 6 that the present method 200 outperformed all the other prior art methods, with the estimating of frequency, in both average error as well as having the lowest standard deviation from the average. The present method managed to determine the vibration frequency to within an average of −0.07% of the true value for the probe set 1 results and an average of −0.02% of the true value for the probe set 2 results. This is more accurate than the prior art AR method that determined the vibration frequency to within an average of 6.78% of the true value. The CFF method has no objective means of determining the vibration frequency.

The present method 200 determined the amplitude of vibration to within approximately the same accuracy as the AR method but much more accurately than the CFF method. This one example illustrates how one specific implementation of the present method 200 has been proven as much more accurate in determining the vibration characteristics of rotor blades during an experimental test.

The specific choices of probability functions and optimization functions for this experimental test can be amended or changed. One can, for instance, express the vibration model as a state variable and use a Kalman filter to track the progress of the variable through several revolutions. One can also use a Monte Carlo sampling method to determine the posterior probability over the vibration frequency instead of an optimization routine to find the most probable result.

The specific implementation of the present method 200 for this experiment used the mean of the posterior distribution, expressed in Eq. 18 and not the covariance of the solution, expressed in Eq. 19. It is possible to construct a goodness-of-fit criteria that use the complete posterior distribution of the Bayesian inference.

The method 200 and system 100 in accordance with the invention are more noise tolerant than prior art methods (e.g., AR and CFF methods). The Applicant has observed that two problems inherently present in BTT data are small sample size and sensitivity to noise. The present invention addresses both problems. Both existing curve fitting techniques mentioned (AR and CFF methods) use a least squares approach to solve for the model coefficients. The Applicant notes that least squares fitting may be inaccurate under a small sample size and large quantities of noise. It is thus beneficial to use the present method 200 and system 100 which solves the coefficients accurately in the presence of these two factors. The Applicant notes that the present method 200 has, by solving the vibration parameters probabilistically, potential applications that do not yet exist in prior art, such as the setting of probabilistic vibration amplitude alarm thresholds to stay clear of damaging operating conditions more reliably.

The invention claimed is:

1. A method of estimating vibration characteristics of moving rotor blades in a turbomachine comprising a housing and rotor including a shaft with the rotor blades attached thereto, using Blade Tip Timing (BTT), the method comprising:
    measuring, by at least one proximity sensor, a Time-of-Arrival (ToA) of a proximate tip of a moving rotor blade;
    storing, in a memory module at least temporarily, timing data indicative of a plurality of ToA measurements of the rotor blade;
    manipulating, by a control module, the stored timing data to determine a corresponding blade tip deflection at each measured ToA;
    expressing, by the control module, a blade tip vibration behaviour as a Bayesian statistical model consisting of intermediate model parameters representing vibration amplitude, frequency, phase, and offset, wherein model coefficients in the statistical model are probabilistic quantities;
    expressing, by the control module, the determined blade tip deflections as observed values in the statistical model;
    manipulating, by the control module, the intermediate model parameters in the statistical model using Bayesian linear regression or Bayesian inference thereby to estimate the intermediate model parameters and consequently vibration behaviour of the rotor blade; and
    assessing, by the control module and through an appropriate goodness-of-fit criteria or Bayesian model evidence, accuracy of the determined model coefficients.

2. The method of claim 1, comprising measuring, by a shaft encoder, signals that can be used to estimate the shaft rotational motion as a function of time.

3. The method of claim 1, comprising fixing, through prior knowledge of the blades, some of the intermediate model parameters and solving or inferring other intermediate model parameters.

4. The method of claim 1, comprising raising an alert in response to the estimated vibration characteristics exceeding a first threshold.

5. The method of claim 4, wherein raising the alert comprises sending an alert message to a designated recipient.

6. The method of claim 1, comprising automatically stopping the turbomachine in response to the estimated vibration characteristics exceeding a second threshold.

7. The method of claim 6, comprising sending, by the control module, an interrupt message to a control system of the turbomachine.

8. The method of claim 1, comprising long term monitoring of the inferred model coefficients, manipulations of the inferred model coefficients or tip deflections to identify trends that might be indicative of impending rotor blade failure, or other changes in other aspects of the turbomachine characteristics.

9. The method of claim 8, comprising sending, by the control module, an interrupt message to the control system of the turbomachine or an alert message to a designated recipient if the long term trend of the monitored quantity indicates damage to the turbomachine.

10. The method of claim 1, comprising converting of the probabilistic model parameters into probabilistic estimates of damage accumulated by the rotor blade due to vibration.

11. The method of claim 10, wherein a mapping function is used to map between blade vibration model coefficients and stress in the blade, and a conversion function which is then used to map between the stress state in the blade and an accumulated damage.

12. The method of claim 1, comprising creating a guideline that maps turbomachine operating conditions to blade vibration or blade damage accumulation, the guideline being useful as an operational tool to stay away from damaging operating conditions.

13. The method of claim 1, comprising measuring a tip deflection every time the rotor blade passes the sensor.

14. The method of claim 13, wherein there are plural sensors arranged circumferentially around the housing, the method comprising measuring the ToA of a blade tip at various angular orientations.

15. A non-transitory computer-readable medium which, when executed by a computer, causes the computer to perform the method of claim 1.

16. A system configured to determine vibration characteristics of moving rotor blades in a turbomachine comprising a housing and rotor including a shaft with the rotor blades attached thereto, using Blade Tip Timing (BTT), the system comprising:

at least one proximity sensor operable to measure a Time-of-Arrival (ToA) of a proximate tip of a moving rotor blade;
a memory module communicatively coupled to the sensor and configured to store, at least temporarily, timing data indicative of a plurality of ToA measurements of the rotor blade; and
a control module communicatively coupled to the memory module and configured to:
manipulate the stored timing data signals to determine a corresponding blade tip deflection at each measured ToA;
express the blade tip vibration as a Bayesian statistical model consisting of intermediate model parameters representing vibration amplitude, frequency, phase, and offset, wherein model coefficients in the statistical model are probabilistic quantities;
express the determined blade tip deflections as observed values in the statistical model;
manipulate the intermediate model parameters in the statistical model using Bayesian linear regression or Bayesian inference thereby to estimate the intermediate model parameters and consequently vibration behaviour of the rotor blade; and
assess, through an appropriate goodness-of-fit criteria or Bayesian model evidence, accuracy of the determined model coefficients.

17. The system of claim 16, comprising a shaft encoder that is used to obtain raw data from the rotor which is processed in the control module to determine the shaft motion.

18. The system of claim 16, configured to implement the method of claim 1.

* * * * *